(12) United States Patent
Allaire et al.

(10) Patent No.: US 9,519,949 B2
(45) Date of Patent: Dec. 13, 2016

(54) DETERMINING TRANSFORMATION BETWEEN DIFFERENT COORDINATE SYSTEMS

(71) Applicant: KONINKLIJKE PHILIPS N.V., Eindhoven (NL)

(72) Inventors: Stéphane Allaire, Nanterre (FR); Alexandra Groth, Hamburg (DE); Juergen Weese, Norderstedt (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/656,765

(22) Filed: Mar. 13, 2015

(65) Prior Publication Data
US 2016/0267626 A1 Sep. 15, 2016

(51) Int. Cl.
*G06K 9/00* (2006.01)
*G06T 3/00* (2006.01)
(Continued)

(52) U.S. Cl.
CPC . *G06T 3/00* (2013.01); *G06K 9/46* (2013.01); *G06K 9/52* (2013.01); *G06K 9/6201* (2013.01);
(Continued)

(58) Field of Classification Search
CPC ..... A61B 5/0013; A61B 5/064; A61B 6/0492; G06T 2207/30004; G06T 7/0038; G06T 2207/30048; G06T 7/0024; G06T 7/0026; G06T 3/0068; G06K 9/32; G06K 9/3233
See application file for complete search history.

(56) References Cited

U.S. PATENT DOCUMENTS 6,106,466 A * 8/2000 Sheehan ............ A61B 5/1075
128/916
6,500,123 B1 * 12/2002 Holloway ............ A61B 8/08
600/443
(Continued)

FOREIGN PATENT DOCUMENTS

EP 1881453 A2 7/2007
GB 2472142 A 7/2010
(Continued)

OTHER PUBLICATIONS

Bhatia et al (Consistent Groupwise Non-Rigid Registration for Atlas Construction, IEEE 2004, pp. 908-911).*

*Primary Examiner* — Amara Abdi

(57) ABSTRACT

A system (100) is provided for determining a transformation between different coordinate systems associated with different medical data. In determining the transformation, the system (100) makes use of a third set of anatomical landmarks (040) defined in a reference coordinate system to match a first set of anatomical landmarks (010) defined in a first coordinate system to a second set of anatomical landmarks (020) defined in a second coordinate system. Effectively, the third set of anatomical landmarks is used as an intermediary in obtaining the transformation between both input sets of coordinate systems. As the third set of anatomical landmarks includes the anatomical landmarks of both input sets, it is not needed for both input sets to be identical or even to overlap. Rather, even in case both input sets are entirely disjunct, i.e., not-overlapping, it is still possible to determine the transformation between the different coordinate systems.

15 Claims, 5 Drawing Sheets

(51) Int. Cl.
  *G06T 7/00* (2006.01)
  *G06K 9/52* (2006.01)
  *G06K 9/46* (2006.01)
  *G06K 9/62* (2006.01)

(52) U.S. Cl.
  CPC ..... *G06T 7/0012* (2013.01); *G06K 2009/4666* (2013.01)

(56) References Cited

U.S. PATENT DOCUMENTS

| | | | |
|---|---|---|---|
| 2010/0034440 A1 | 2/2010 | Zhan et al. | |
| 2010/0135546 A1 | 6/2010 | Cziria | |
| 2010/0286995 A1* | 11/2010 | Pekar | G06Q 50/22 705/2 |
| 2012/0082354 A1* | 4/2012 | Peters | G06T 7/0083 382/128 |
| 2013/0094738 A1* | 4/2013 | Bond | G06T 7/0028 382/131 |
| 2013/0237811 A1* | 9/2013 | Mihailescu | A61B 5/064 600/424 |

FOREIGN PATENT DOCUMENTS

| | | |
|---|---|---|
| WO | 2006003203 A1 | 1/2006 |
| WO | 2007016397 A2 | 2/2007 |
| WO | 2012114239 A1 | 8/2012 |
| WO | 2013132402 A2 | 9/2013 |

\* cited by examiner

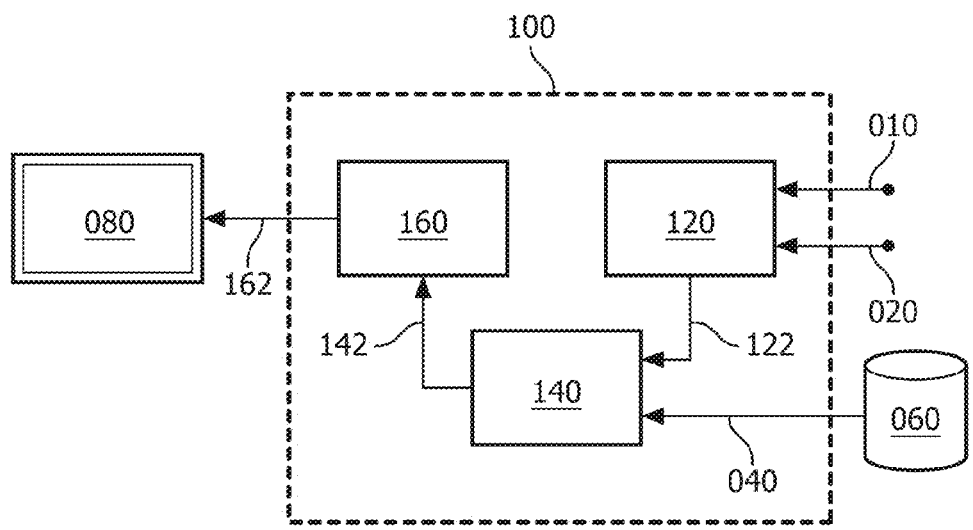
FIG. 1
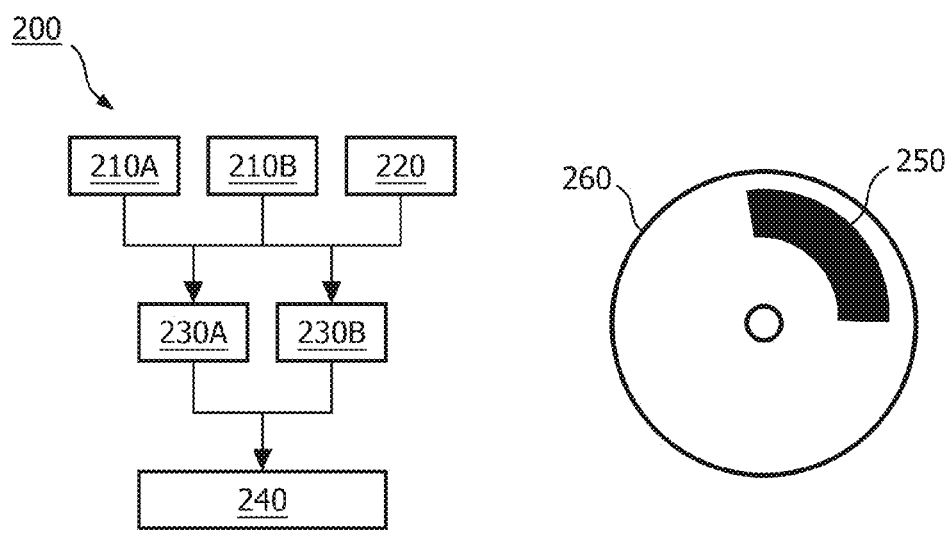
FIG. 2
FIG. 3

DETERMINING TRANSFORMATION BETWEEN DIFFERENT COORDINATE SYSTEMS

FIELD OF THE INVENTION

The invention relates to a system and method for determining a transformation between different coordinate systems associated with different medical data. The invention further relates to a workstation and imaging apparatus comprising the system, and to a computer program product for causing a processor system to perform the method.

BACKGROUND OF THE INVENTION

Many medical departments are nowadays increasingly organized according to disease rather than to modality. A reason for this is that, e.g., in the case of cardiology, no single cardiac imaging modality exists which gives all the relevant information. Information from Computed Tomography (CT), Magnetic Resonance (MR), Ultrasound, and other image modalities is therefore increasingly combined. This combining of information may involve displaying medical images from different image modalities side-by-side, fusing them, or otherwise combining information from several medical images. To facilitate the combining, the medical images may be mutually aligned. Such image alignment is also referred to as image registration, and typically involves determining a transformation between the different coordinate systems associated with the medical images, and subsequently using the transformation to compensate for any misalignment between the medical images.

It is known to align medical images based on anatomical landmarks. For example, US 2013/0094738 A1 describes a method and apparatus for aligning two sets of medical imaging data. The first and second sets of image data are obtained respectively, using first and second different medical imaging modalities, of an anatomical feature of a subject. For each set, an axis of the anatomical feature and a landmark point for the anatomical feature is determined. For example, the anatomical feature may be the left ventricle of the heart, and the landmark may be the apex of the left ventricle. The first and second sets are then aligned by comparing the respective axes and landmark points.

A problem of the alignment of US 2013/0094738 A1 is that it is insufficiently flexible to deal with differences between the two sets of medical imaging data.

SUMMARY OF THE INVENTION

It would be advantageous to obtain a system or method for determining a transformation between different coordinate systems associated with different medical data which can better deal with the differences between such medical data.

To better address this concern, a first aspect of the invention provides system for determining a transformation between different coordinate systems associated with different medical data, comprising:
a landmark input for obtaining first coordinates representing a first set of anatomical landmarks in a first coordinate system and second coordinates representing a second set of anatomical landmarks in a second coordinate system;
a matching subsystem configured for:
providing reference coordinates representing a third set of anatomical landmarks in a reference coordinate system, the third set of anatomical landmarks comprising the first set of anatomical landmarks and the second set of anatomical landmarks; and
determining a transformation between the first coordinate system and the second coordinate system by:
i) determining a first intermediate transformation between the first coordinate system and the reference coordinate system by matching the first set of anatomical landmarks to the third set of anatomical landmarks;
ii) determining a second intermediate transformation between the second coordinate system and the reference coordinate system by matching the second set of anatomical landmarks to the third set of anatomical landmarks; and
iii) combining the first intermediate transformation and the second intermediate transformation to obtain the transformation.

A further aspect of the invention provides a workstation or imaging apparatus comprising the system.

A further aspect of the invention provides a method for a determining a transformation between different coordinate systems associated with different medical data, comprising:
obtaining first coordinates representing a first set of anatomical landmarks in a first coordinate system;
obtaining second coordinates representing a second set of anatomical landmarks in a second coordinate system;
providing reference coordinates representing a third set of anatomical landmarks in a reference coordinate system, the third set of anatomical landmarks comprising the first set of anatomical landmarks and the second set of anatomical landmarks; and
determining a transformation between the first coordinate system and the second coordinate system by:
i) determining a first intermediate transformation between the first coordinate system and the reference coordinate system by matching the first set of anatomical landmarks to the third set of anatomical landmarks;
ii) determining a second intermediate transformation between the second coordinate system and the reference coordinate system by matching the second set of anatomical landmarks to the third set of anatomical landmarks; and
iii) combining the first intermediate transformation and the second intermediate transformation to obtain the transformation.

The above measures involve obtaining coordinates of two sets of anatomical landmarks. Each set of anatomical landmarks is defined in a different coordinate system which is associated with different medical data. Such medical data may be medical image data, i.e., represent different medical images, but may also be other types of data in which anatomical landmarks may be defined, such as meshes, contours, etc. Each set of anatomical landmarks may have been generated in various ways, e.g., using an automatic extraction algorithm or by manual annotation. As the medical data to which the sets of anatomical landmarks relate is different, the sets of anatomical landmarks may also mutually differ. For example, the first set of anatomical landmarks may comprise a landmark for the pulmonary valve of the heart whereas the second set of anatomical landmarks may not comprise such an anatomical landmark, e.g., due the pulmonary valve being poorly visible in the medical data. Similarly, the second set of anatomical landmarks may comprise an anatomical landmark for the mitral valve whereas the first set of anatomical landmarks may not.

A third set of anatomical landmarks is provided which at least comprises the anatomical landmarks of both sets of anatomical landmarks. In the context of the above example, the third set of anatomical landmarks may thus comprise an anatomical landmark for the pulmonary valve as well as for the mitral valve. Effectively, the third set of anatomical landmarks may constitute an overall, 'master' set of anatomical landmarks, e.g., by being designed to include all anatomical landmarks of a particular anatomical structure. Therefore, the third set of anatomical landmarks may also be called as an overall set of anatomical landmarks. The third set of anatomical landmarks is defined as reference coordinates in a reference coordinate system, thereby establishing a geometric relation between the individual anatomical landmarks. Therefore, the third set of anatomical landmarks may also be called as a reference set of anatomical landmarks.

In accordance with the present invention, the transformation between the first coordinate system and the second coordinate system is determined via the reference coordinate system in that separate transformations are determined between each of the two coordinate systems and the reference coordinate system. These separate transformations are determined on the basis of matching the anatomical landmarks in the respective coordinate system to those of the reference set. As a result, for a particular anatomical landmark in the respective coordinate system, a corresponding coordinate in the reference coordinate system is obtained. Having obtained the separate transformations to/from the reference coordinate system, the overall, 'direct' transformation from the first coordinate system to the second coordinate system can be obtained, namely by combining both separate transformations.

The present invention is based on the insight that using landmarks for image alignment and similar applications, which in general involve determining a transformation between different coordinate systems associated with different medical data, is hindered by the fact that the sets of landmarks may be non-identical or even disjunct. This may be caused by the different visibility of an anatomical structure in the different medical data. Another cause may be that both sets of landmarks may be obtained from different sources, e.g., from an automatic extraction algorithm and from a manual annotation. Although in the case of non-identical yet overlapping sets of anatomical landmarks, it may still be possible to use the common anatomical landmarks of both sets, this is disadvantageous since not all possible landmark information is used, thereby decreasing the reliability and/or accuracy of the transformation. Moreover, in case both sets of anatomical landmarks are non-overlapping, such landmark-based image alignment entirely fails.

The present invention addresses this problem by providing a third set of anatomical landmarks in a reference coordinate system for use as an intermediary in obtaining the transformation between both input sets of coordinate systems. As the third set of anatomical landmarks includes the anatomical landmarks of both input sets, it is not needed for both input sets to be identical or even to overlap. Rather, even in case both input sets are entirely disjunct, i.e., not-overlapping, it is still possible to determine the transformation between the different coordinate systems. Advantageously, differences between medical data, between sources for the landmarks, etc., can be better dealt with.

Optionally, the third set of anatomical landmarks is defined with respect to a deformable model such that the reference coordinates representing the third set of anatomical landmarks is defined in a reference coordinate system associated with the deformable model, the deformable model being arranged for fitting an anatomical structure in a medical image. This aspect of the present invention relates to a deformable model. It is known to segment anatomical structures in medical images using deformable models. Such type of segmentation is also referred to as model-based segmentation. The third set of anatomical landmarks is defined with respect to the deformable model, e.g., by appropriately labeling parts of the deformable model, such as mesh triangles, nodes, etc. It thus suffices to provide an appropriately labeled deformable model.

Optionally, the deformable model represents a mean shape of the anatomical structure across a plurality of patients, or a patient adapted model adapted for the anatomical structure of a patient. A mean shape model represents the mean geometric relation between anatomical landmarks, whereas a patient adapted model provides the patient-specific geometric relation between anatomical landmarks.

Optionally, the deformable model is represented by model data defining geometry of the anatomical structure in the medical image, and the third set of anatomical landmarks is encoded in the model data. A deformable model may be defined by model data. In particular, the model data may define a geometry of the anatomical structure, e.g., in the form of a multi-compartmental mesh of triangles. The third set of anatomical landmarks is thus encoded in the model data, e.g., by adding anatomical labels to the triangles representing the position of the anatomical landmarks.

Optionally, each landmark of the first set of anatomical landmarks, the second set of anatomical landmarks and the third set of anatomical landmarks is constituted by a coordinate and an anatomical label, and the matching subsystem is configured for matching sets of anatomical landmarks by matching anatomical labels of the sets of anatomical landmarks. Each anatomical landmark is thus constituted by a coordinate and an anatomical label. For example, the anatomical label may comprise text strings such as "Aortic-Valve" that indicate the location of the landmark in the medical image or deformable model. The anatomical label of the anatomical landmark may be linked to or associated with the coordinate of such anatomical landmark. The anatomical label may be derived from a landmark input component, such as a labeling input interface for allowing inputting the text strings of the anatomical label. The matching based on anatomical labels is particularly efficient since it allows such matching to be determined based on a relatively simple comparison, e.g. comparing whether the text strings in the anatomical label of two anatomical landmarks are identical or not. If so, then there is a match. In contrast, without using anatomical labels, it may be needed to match the anatomical landmarks based on, e.g., matching spatial topologies, which is typically more complex than the matching of anatomical labels.

Optionally, the matching subsystem is configured for differently weighting matching anatomical landmarks when obtaining the first intermediate transformation and/or the second intermediate transformation. Weighting anatomical landmarks allows for emphasizing matching anatomical landmarks, e.g., based on a quality of matching.

Optionally, the first set of anatomical landmarks is defined with respect to a first medical image and the second set of anatomical landmarks is defined with respect to a second medical image. The coordinates of the respective anatomical landmarks are thus image coordinates. As such, the transformation enables a matching of image coordinates between the respective coordinate systems of both medical images. It is noted that anatomical landmarks may be defined with respect to a medical image in various ways, e.g., by applying an automatic extraction algorithm to a medical image or by manual image annotation.

Optionally, the matching subsystem is configured for using the transformation to mutually align the first medical image and the second medical image.

Optionally, the system further comprises a display subsystem for simultaneously displaying the first medical image and the second medical image after said mutually aligning.

Optionally, the matching subsystem is configured for using the transformation to complement the first set of anatomical landmarks with one or more anatomical landmarks of the second set of anatomical landmarks. As the first set of anatomical landmarks and the second set of anatomical landmarks may be non-identical or disjunct sets, the transformation can be used to complement the first set of landmarks with one or more anatomical landmarks of the second set of anatomical landmarks. Alternatively or additionally, the first set of landmarks may be complemented with one or more anatomical landmarks of the third set of anatomical landmarks, namely by using the first intermediate transformation.

Optionally, the first set of anatomical landmarks is defined with respect to a first mesh, the second set of anatomical landmarks is defined with respect to a second mesh, and the matching subsystem is configured for using the transformation to mutually align the first mesh and the second mesh. Instead of mutually aligning medical images, the transformation may also be used to align other types of medical data. For example, meshes may be aligned in which anatomical landmarks are defined and/or placed.

Optionally, the first set of anatomical landmarks and the second set of anatomical landmarks are non-identical or disjunct sets.

Optionally, the landmark subsystem is configured for obtaining the first set of anatomical landmarks by fitting the deformable model to a first medical image. The fitting of a deformable model provides an efficient way of extracting landmarks from a medical image.

Optionally, the matching subsystem is configured for emphasizing anatomical landmarks in the weighting which are included in the first set of anatomical landmarks and in the second set of anatomical landmarks. Anatomical landmarks which are included in both sets of landmarks typically provide reliable constraints for determining the transformation between the first coordinate system and the second coordinate system since ideally the transformation should obtain a (substantial) matching of their respective coordinates.

In summary, a system is provided for determining a transformation between different coordinate systems associated with different medical data. In determining the transformation, the system makes use of a third set of anatomical landmarks defined in a reference coordinate system to match a first set of anatomical landmarks defined in a first coordinate system to a second set of anatomical landmarks defined in a second coordinate system. Effectively, the third set of anatomical landmarks is used as an intermediary in obtaining the transformation between both input sets of coordinate systems. As the third set of anatomical landmarks includes the anatomical landmarks of both input sets, it is not needed for both input sets to be identical or even to overlap. Rather, even in case both input sets are entirely disjunct, it is still possible to determine the transformation between the different coordinate systems.

It will be appreciated by those skilled in the art that two or more of the above-mentioned embodiments, implementations, and/or aspects of the invention may be combined in any way deemed useful.

Modifications and variations of the system and/or the computer program product, which correspond to the described modifications and variations of the method, can be carried out by a person skilled in the art on the basis of the present description.

A person skilled in the art will appreciate that the invention may be applied to multi-dimensional image data, e.g. to two-dimensional (2D), three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

The invention is defined in the independent claims. Advantageous embodiments are defined in the dependent claims.

BRIEF DESCRIPTION OF THE DRAWINGS

These and other aspects of the invention are apparent from and will be elucidated with reference to the embodiments described hereinafter. In the drawings, FIG. 1 shows a system for determining a transformation between different coordinate systems associated with different medical data, with the system comprising an optional display subsystem for displaying an output of the system;

FIG. 2 shows a method for determining the transformation;

FIG. 3 shows a computer program product comprising instructions for causing a processor system to perform the method;

DETAILED DESCRIPTION OF EMBODIMENTS

Figure 4:
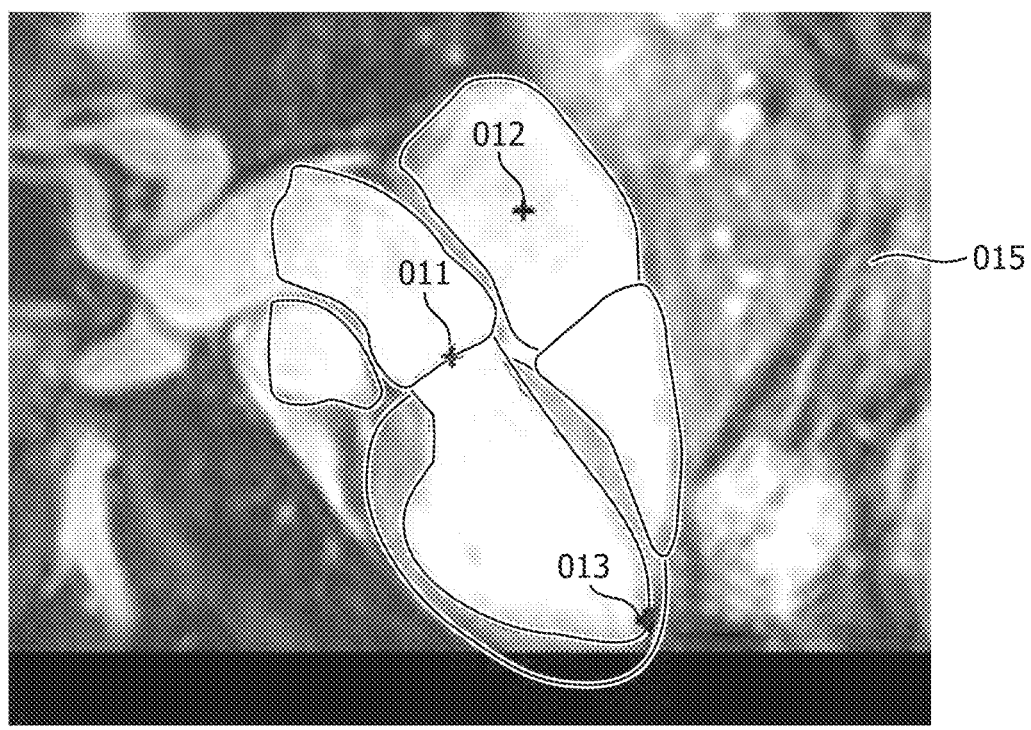
FIG. 4 shows a first medical image in the form of a Magnetic Resonance (MR) image of a patient, the MR image comprising a first set of anatomical landmarks.

FIG. 1 shows a system 100 for determining a transformation between different coordinate systems associated with different medical data. The system 100 comprises a landmark input 120 for obtaining first coordinates representing a first set of anatomical landmarks in a first coordinate system and second coordinates representing a second set of anatomical landmarks in a second coordinate system. The landmark input 120 may also include a labeling input component for obtaining text strings of anatomical labels linked to the first and the second coordinates representing the first and the second set of anatomical landmarks, respectively. As shown in FIG. 1, the first coordinates may be obtained in the form of first coordinate data 010 from an external source (not shown) such as a database, workstation or imaging apparatus. The database may, for example, be constituted by a Picture Archiving and Communication System (PACS), and the landmark input 120 may be constituted by a network interface to the PACS. Alternatively, the first coordinates may be obtained from an internal source, e.g., by the system 100 comprising an user interaction subsystem for enabling a user to place anatomical landmarks in medical data, or by the system 100 comprising an landmark extraction subsystem for automatically extracting anatomical landmarks from medical data. The second coordinates may be obtained in the form of second coordinate data 020. It is noted that the second coordinate data 020 may also be obtained in various ways, such as from the mentioned external sources and/or internal source(s).

The system 100 further comprises a matching subsystem 140 configured for providing reference coordinates representing a third set of anatomical landmarks in a reference coordinate system. The third set of anatomical landmarks comprises at least the first set of anatomical landmarks and the second set of anatomical landmarks. The matching subsystem 140 may provide the reference coordinates by obtaining them in the form of reference coordinate data 040 from an internal or external storage 060.

The matching subsystem 140 is configured for determining a transformation between the first coordinate system and the second coordinate system as follows.

The matching subsystem 140 determines a first intermediate transformation between the first coordinate system and the reference coordinate system and a second intermediate transformation between the second coordinate system and the reference coordinate system. For that purpose, the matching subsystem 140 is shown to receive the first coordinates and second coordinates from the landmark input 120, i.e., in the form of coordinate data 122. To determine the first intermediate transformation, the matching subsystem 140 matches the first set of anatomical landmarks to the third set of anatomical landmarks. To determine the second intermediate transformation, the matching subsystem 140 matches the second set of anatomical landmarks to the third set of anatomical landmarks. Having obtained the first intermediate transformation and the second intermediate transformation, both intermediate transformations are then combined to obtain the transformation between the first coordinate system and the second coordinate system.

FIG. 1 further shows an optional aspect in that the system 100 is shown to comprise a display subsystem 160 for visualizing an output 142 of the matching subsystem 140. For that purpose, the display subsystem 160 is shown to generate display data 162 for a display 080. It is noted that the operation of the system 100 and its optional aspects, such as the display subsystem 160, will be further described with reference to FIGS. 4-7.

It is noted that the system 100, and each of its subsystems, may be implemented in various ways, for example as a combination of software and hardware. The hardware may be provided by a workstation, e.g., in the form of one or more processors, one or more memories, memory interfaces, network interfaces, etc., or by a (distributed) server. The software may comprise instructions for causing the hardware to carry out the aforementioned operations. For example, a first part of the software may cause the hardware to carry out the operation of the landmark input, a second part of the software may cause the hardware to carry out the operation of the matching subsystem, etc.

FIG. 2 shows a method 200 for determining a transformation between different coordinate systems associated with different medical data. The method 200 may correspond to an operation of the system 100. However, the method 200 may also be performed in separation of the system 100, e.g., using a different system or device.

The method 200 comprises, in a step titled "OBTAINING COORDINATES OF FIRST SET OF ANATOMICAL LANDMARKS", obtaining 210A first coordinates representing a first set of anatomical landmarks in a first coordinate system. The method 200 further comprises, in a step titled "OBTAINING COORDINATES OF SECOND SET OF ANATOMICAL LANDMARKS", obtaining 210B second coordinates representing a second set of anatomical landmarks in a second coordinate system. The method 200 further comprises, in a step titled "OBTAINING COORDINATES OF THIRD SET OF ANATOMICAL LANDMARKS", providing 220 reference coordinates representing a third set of anatomical landmarks in a reference coordinate system, the third set of anatomical landmarks comprising the first set of anatomical landmarks and the second set of anatomical landmarks. The method 200 further comprises determining a transformation between the first coordinate system and the second coordinate system by, in a step titled "DETERMINING FIRST INTERMEDIATE TRANSFORMATION", determining 230A a first intermediate transformation between the first coordinate system and the reference coordinate system by matching the first set of anatomical landmarks to the third set of anatomical landmarks, in a step titled "DETERMINING SECOND INTERMEDIATE TRANSFORMATION", determining 230B a second intermediate transformation between the second coordinate system and the reference coordinate system by matching the second set of anatomical landmarks to the third set of anatomical landmarks, and in a step titled "COMBINING INTERMEDIATE TRANSFORMATIONS TO OBTAIN OVERALL TRANSFORMATION", combining 240 the first intermediate transformation and the second intermediate transformation to obtain the transformation.

It is noted that the above steps may be performed in any suitable order. For example, the steps of obtaining 210A, obtaining 210B and providing 220 may be performed in parallel, in sequence or as a combination thereof. Similarly, the steps of determining 203A and determining 230B may be performed in parallel, in sequence or as a combination thereof.

FIG. 3 shows a computer program product comprising instructions for causing a processor system to perform the method of FIG. 2, i.e., comprising a computer program. The computer program may be comprised in a non-transitory manner on a computer readable medium 260, e.g., as a series 250 of machine readable physical marks and/or as a series of elements having different electrical, e.g., magnetic, or optical properties or values.

The operation of the system of FIG. 1 and the method of FIG. 2, including various optional aspects thereof, may be explained in more detail as follows. Here, cardiac medical data is used as an example. It will be appreciated, however, that the present invention may be equally applied to other types of medical data, i.e., non-cardiac.

Figure 5:
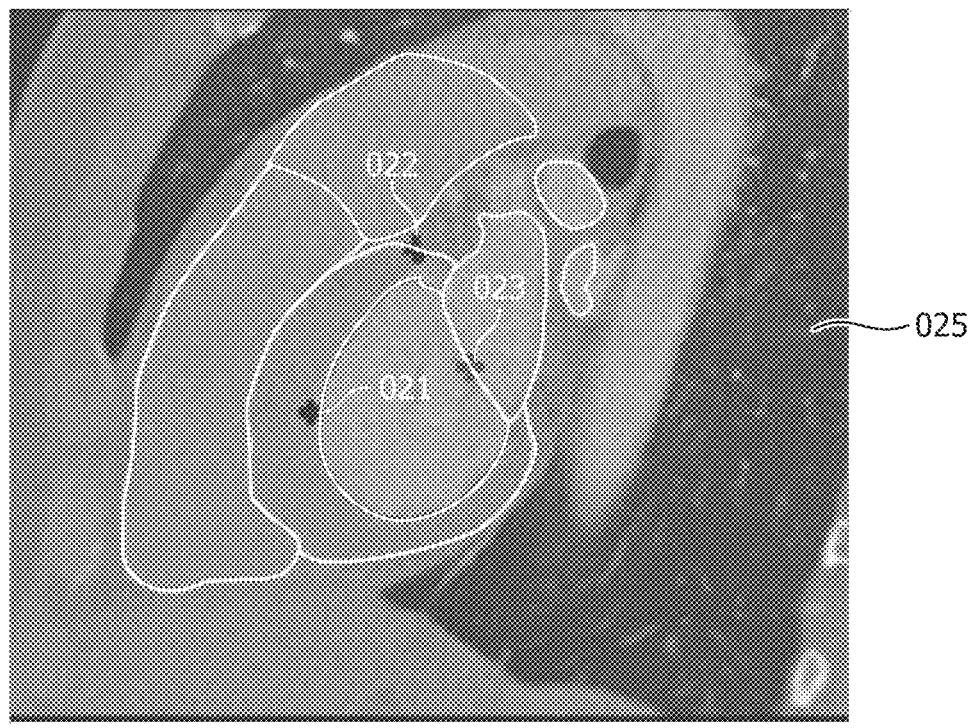
FIG. 5 shows a second medical image in the form of a Computed Tomography (CT) image of the patient, the CT image comprising a second set of anatomical landmarks.

FIG. 4 shows a first medical image in the form of a Magnetic Resonance (MR) image 015 of a patient, and FIG. 5 shows a second medical image 025 in the form of a Computed Tomography (CT) image of the patient. The MR image 015 is shown to comprise a first set of anatomical landmarks 011-013, and the CT image 025 is shown to comprise a second set of anatomical landmarks 021-023. The medical images may have been obtained during an imaging study of the patient which involved acquiring multi-model image data. Accordingly, both medical images may show the same anatomical structure, i.e., same organ.

The respective sets of anatomical landmarks 011-013, 021-023 may have been identified in (i.e., extracted from) the respective medical images in various ways. For example, the anatomical landmarks may have been automatically extracted using automatic extraction algorithms. Such automatic extraction algorithms may be implemented by a landmark extraction subsystem or by another entity. Examples include greedy snake segmentation as described in the publication "*Fully automatic segmentation of short and long axis cine cardiac MR*" by Fradkin M. et al., Journal of Cardiovascular Magnetic Resonance, Vol. 11 Suppl. 1, Proceedings of the 12th Annual SCMR Scientific Sessions, 2009. Another example is the model-based segmentation described in the publication "*Automatic model-based segmentation of the heart in CT images*" by Ecabert, O. et al., Medical Imaging, IEEE Transactions on 27(9), 2008, pp. 1189-1201. Here, a set of anatomical landmarks is encoded into a deformable model, i.e., a so-termed mean mesh model. By applying the deformable model to medical data, these landmarks are transferred to anatomical regions of the patient. As a result, anatomical landmarks are identified in the medical data.

Aside from the abovementioned examples, it will be appreciated that many other suitable algorithms exist in the field of medical imaging analysis which may be used to identify landmarks in medical data. Alternatively, also a user may be involved in identifying the anatomical landmarks. For example, the user may be requested to manually identify anatomical landmarks by clicking on parts of a displayed medical image.

In the examples of FIGS. 4 and 5, it can be seen that the anatomical landmarks may not directly correspond to each other in that they may represent different parts of the anatomical structure. Nevertheless, there may be a need to align both medical images or, in general, their coordinate systems. In FIG. 4, the anatomical landmarks 011-013 may represent the aortic valve 011, the right atrium center 012 and the left ventricular bloodpool apex 013 and may be labeled accordingly, e.g., with text strings such as "AorticValve", "RightAtriumCenter", "LeftVentricularBloodpoolApex" or any other suitable type of labeling. In FIG. 5, the anatomical landmarks 021-023 may represent the ventricular mid septum 021, the mitral annulus anterior 022 and the mitral valve center 023, and may be labeled accordingly, e.g., with text strings such as "VentricularMidSeptum", "MitralAnnulusAnterior", "MitralValveCenter" or any other suitable type of labeling.

In order to enable the alignment between the coordinate systems of the first medical image 015 and the second medical image 025, reference coordinates may be obtained representing a third set of anatomical landmarks in a reference coordinate system. The third set of anatomical landmarks may comprise the first set of anatomical landmarks and the second set of anatomical landmarks. For example, the third set of anatomical landmarks may comprise the following collection of anatomical landmarks, which may include the typical anatomical landmarks encountered in cardiac imaging across various imaging modalities. Here, the anatomical landmarks are identified by their optional anatomical labels:

TABLE 1

Example of reference set of anatomical landmarks

| | |
|---|---|
| AorticValve | AorticValveNonCoronarySinus |
| PulmonaryValve | LeftCoronaryArteryOstium |

TABLE 1-continued

Example of reference set of anatomical landmarks

| | |
|---|---|
| MitralValve | RightCoronaryArteryOstium |
| TricuspidValve | LeftCoronaryArteryOrigin |
| LeftAtriumCenter | RightCoronaryArteryOrigin |
| LeftVentricleCenter | LeftCoronaryArteryBase |
| RightAtriumCenter | RightCoronaryArteryBase |
| RightVentricleCenter | AorticValveCommissureRN |
| LeftInferiorPulmonaryVeinOstium | AorticValveCommissureNL |
| LeftSuperiorPulmonaryVeinOstium | AorticValveCommissureLR |
| RightInferiorPulmonaryVeinOstium | MitralAnnulusAnterior |
| RightSuperiorPulmonaryVeinOstium | MitralAnnulusPosterior |
| CoronarySinusOstium | MitralAnnulusAnteroLateral |
| InferiorVenaCavaOstium | MitralAnnulusPosteroMedial |
| SuperiorVenaCavaOstium | AorticOpposition |
| LeftVentricularBloodpoolApex | LeftAtrialAppendageOstium |
| AorticValveLeftSinus | RightAtrialSeptum |
| AorticValveRightSinus | LeftAtrialSeptum |

Figure 6A:
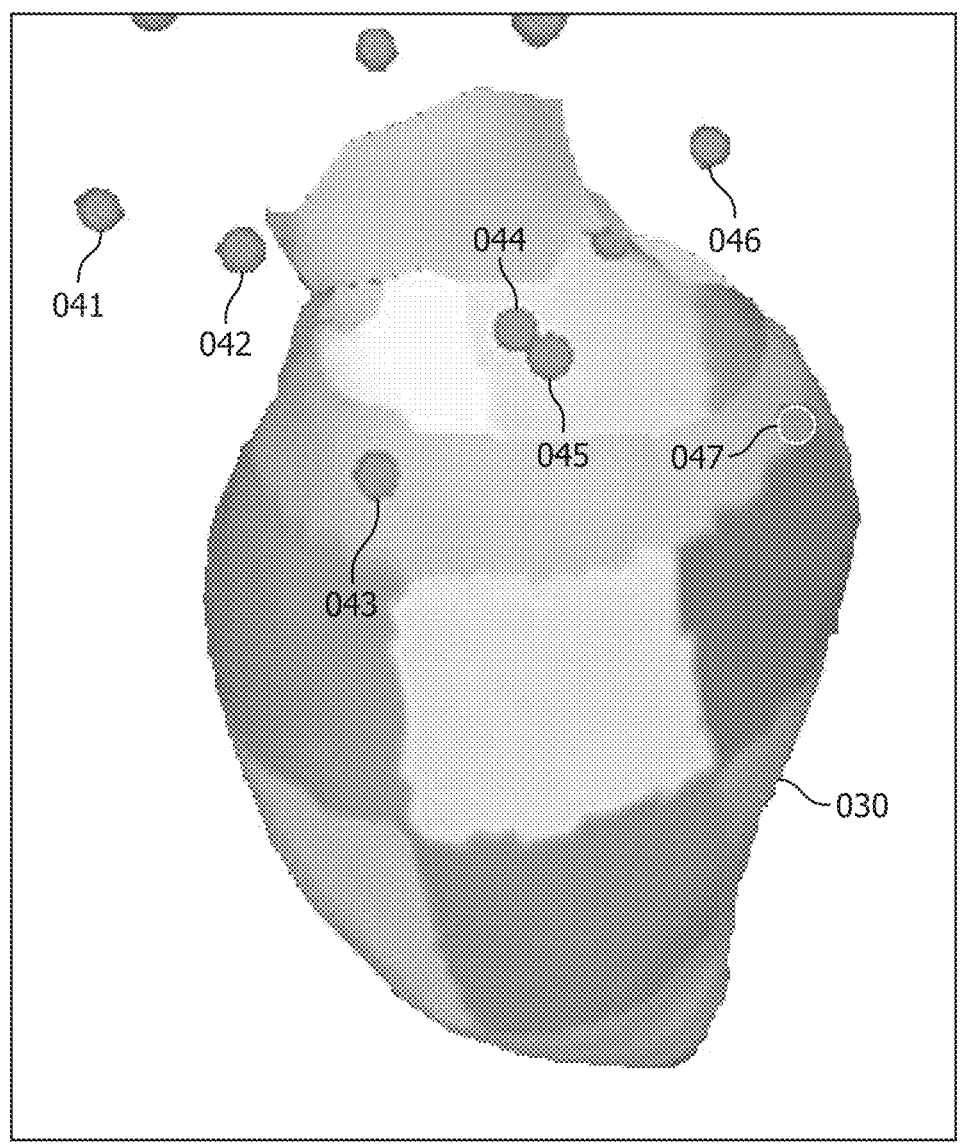
FIGS. 6a, 6b shows a deformable model for fitting a left ventricle of the human heart, the deformable model comprising a third set of anatomical landmarks.
Figure 6B:
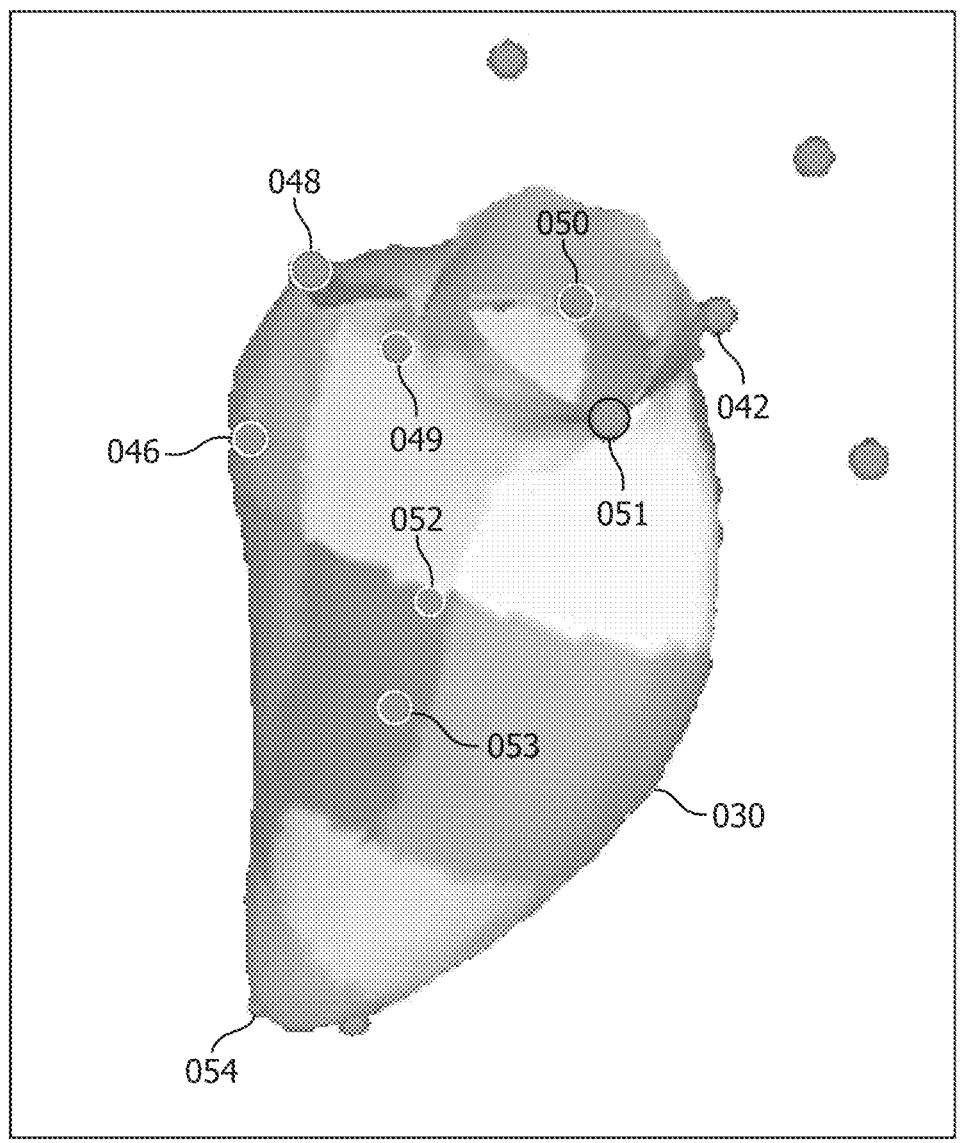

The above anatomical landmarks may be represented as reference coordinates in a reference coordinate system. As such, their mutual location may be known. For example, the third set of anatomical landmarks may be provided as an enumerated list of reference coordinates and their corresponding labels or identifiers. Another example is that the third set of anatomical landmarks may be defined with respect to a deformable model, with the deformable model being arranged for fitting an anatomical structure in a medical image. Accordingly, the reference coordinates may be defined in a reference coordinate system associated with the deformable model. FIGS. 6a and 6b shows an example of such a deformable model 030 in the present context, in that the deformable model is arranged for fitting a left ventricle of the heart. Here, FIGS. 6a and 6b show different sides of the deformable model 030. The exemplary third set of anatomical landmarks 041-054 of FIGS. 6a and 6b includes at least the first set of anatomical landmarks and the second set of anatomical landmarks, namely by comprising as anatomical landmarks:

Pulmonary valve 041,
Mitral annulus anterior 042,
Mitral annulus antero lateral 043,
Mitral valve center 044 (being positioned at the average of the positions of the anatomical landmarks of the mitral annulus anterior, mitral annulus lateral, mitral annulus superior and mitral annulus inferor),
Mitral valve center 045 (being positioned at a geometrical averaged of the positions of all valve triangles),
Tricuspid valve 046,
Mitral annulus postero medial 047,
Right atrium center 048,
Mitral annulus posterior 049,
Aortic valve center 050,
Right coronary artery ostium 051,
Ventricular mid septum 052,
Right ventricle center 053, and
Left ventricular blood pool apex 054.

In accordance with an operation of the matching subsystem, the transformation between the coordinate systems of the MR image 015 and the CT image 025 may be obtained via the deformable model 030, namely by matching the first set of anatomical landmarks to the third set of anatomical landmarks to determine a first intermediate transformation between the coordinate system of the MR image 015 and the reference coordinate system of the deformable model 030, and by matching the second set of anatomical landmarks to the third set of anatomical landmarks to determine a second intermediate transformation between the coordinate system of the CT image 025 and the reference coordinate system of the deformable model 030. Such matching may be based on a matching of anatomical labels, i.e., the finding of corresponding labels in the two respective sets. Having obtained the two intermediate transformations, the transformation between the coordinate systems of the MR image 015 and the CT image 025 may be obtained by combining the first intermediate transformation and the second intermediate transformation.

For example, each intermediate transformation may be obtained by rigidly registering the third set of anatomical landmarks with the respective input set of anatomical landmarks. Accordingly, as intermediate transformations, transformation matrixes may be obtained which follow, e.g., p'=sRp+t, with s being a scaling factor, R a rotation matrix, t a translation, p representing a point in of the input coordinate system and p' representing a point of the reference coordinate system. The transformation between the coordinate systems of the MR image and the CT image may then be obtained by concatenating the first transformation matrix and the inverse of the second transformation matrix, or vice versa. It is noted that the intermediate transformations may also take various other forms, such as affine transformations.

In registering the third set of anatomical landmarks with the respective input set of anatomical landmarks, matching anatomical landmarks may be differently weighted, e.g., based on a quality of match of their corresponding labels, the anatomical importance of the anatomical landmark, etc. In particular, anatomical landmarks which exist in both the first set of anatomical landmarks as well as the second set of anatomical landmarks may be emphasized in such weighting. It is further noted that one of the sets of anatomical landmarks may be obtained by fitting the deformable model to the respective medical image. As such, the respective intermediate transformation may be represented by an identity matrix, and the respective set of anatomical landmarks by the reference set.

Having obtained the transformation between the coordinate systems of the MR image 015 and the CT image 025, or in general, between the first coordinate system and the second coordinate system, various uses of the transformation are conceivable. For example, the transformation may be used to mutually align the first medical image and the second medical image. The mutually aligned medical images may then be simultaneously displayed to a user. The mutual alignment may be maintained throughout the image viewing, e.g., to link the viewports showing the respective medical images. Additionally or alternatively, the transformation may be used to complement the first set of anatomical landmarks with one or more anatomical landmarks of the second set of anatomical landmarks, or in general, be used to transfer anatomical landmarks between both sets. Accordingly, a "landmark trader" may be established which enables anatomical landmarks to be "traded", i.e., transferred, between different medical data.

Additionally or alternatively, one or more anatomical landmarks of the deformable model may be transferred to the medial image data using the established intermediate transformation(s). Namely, in certain subsequent processing tasks, it may be required to have a certain specific set of anatomical landmarks in a specific coordinate system. However, it may not be guaranteed that an input set of anatomical landmarks, such as the first input set of anatomical landmarks, comprises this specific set of anatomical landmarks. Therefore, once the transformation between the different coordinate systems is established, anatomical landmarks may be transferred from the third set of anatomical landmarks or from the second input set of anatomical landmarks to the first input set. For example, the anatomical landmarks "left ventricular blood pool apex", the "mitral valve (center)" and the "ventricular mid septum" may be required for partitioning the left ventricle in the heart segments as defined by the American Heart Association (AHA) and as shown in FIGS. 6a and 6b for enabling identification of the long axis of the heart, the septum and the apical cap. Having established the transformation, the first set of anatomical landmarks may be complemented with these three anatomical landmarks. Accordingly, it may be ensured that these three anatomical landmarks can always be identified in the first coordinate system and that thus the AHA segments can always be defined therein, even if the first input set of anatomical landmarks initially did not comprise one, more or even all of these three anatomical landmarks.

Another example is that a transfer of the complete third set of anatomical landmarks may be desired in when a measurement protocol for post-treatment evaluations is defined on the complete third set of anatomical landmarks. Here, an affine-based registration may be used to establish the intermediate transformation(s).

It will be appreciated that the number of landmarks used in obtaining the intermediate transformation may depend on the dimensionality of the medical data. For example, when determining a transformation between the coordinate systems associated with 2D medical data, it may be sufficient to match two anatomical landmarks from the respective medical data to the third set of anatomical landmarks. However, when determining a transformation between the coordinate systems associated with 3D medical data, a matching of three anatomical landmarks may be needed.

Figure 7:
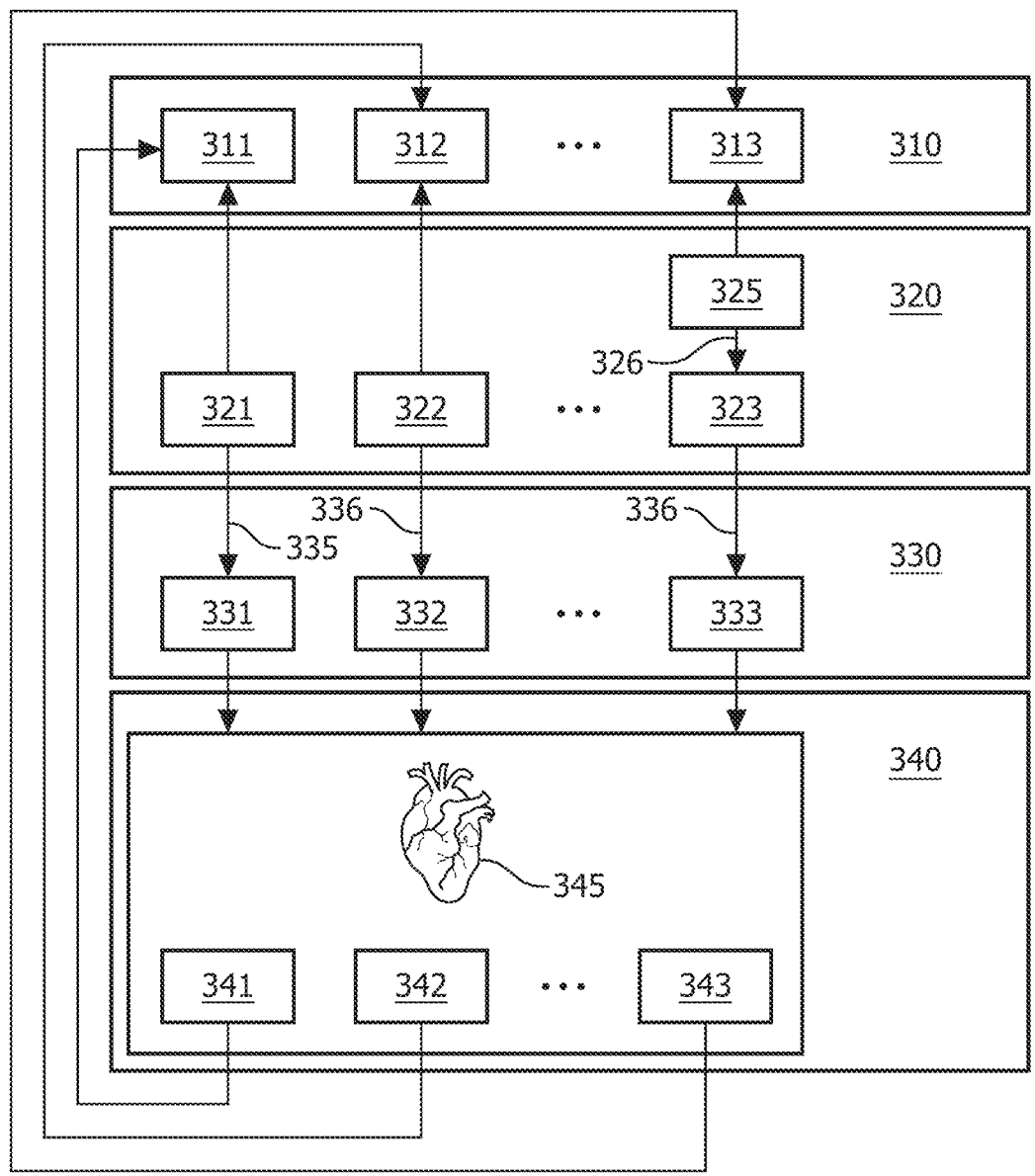
FIG. 7 further illustrates the determining of transformations between different coordinate systems associated with different medical data.

FIG. 7 further illustrates the determining of transformations between different coordinate systems associated with different medical data. Here, from a first image 321, obtained during an input phase 320, anatomical landmarks may be extracted 335 during an information extraction phase 330, yielding a first set of anatomical landmarks 331. Moreover, from a second image 322, anatomical landmarks may be extracted 336, yielding a second set of anatomical landmarks 332. This process may be repeated for each image N 323 which may be selected 326 from a sequence N 325, thereby yielding, as a result of landmark extraction 336, an Nth set of anatomical landmarks 333. Each set of landmarks 331-333 may be matched to the anatomical landmarks of a deformable model 345 (it is noted that the anatomical landmarks are not explicitly shown in FIG. 7), thereby yielding a first transformation matrix 341, a second transformation matrix 342 until an Nth transformation matrix 343. These transformation matrixes may then be used to align the images 321-323 during an alignment phase, thereby yielding a first aligned image 311, a second aligned image 312 until an Nth aligned image 313. It will be appreciated that, instead of performing the landmark extraction and alignment for each image separately, the anatomical landmarks may also be extracted from one of the images of the sequence, with the alignment then being performed for each image of the sequence with the same transformation matrix.

In general, the present invention may be applied to more than two sets of anatomical landmarks. Moreover, although the present invention has been primarily explained based on anatomical landmarks in medical images, the anatomical landmarks may also be associated with other types of medical data, such as, e.g., surface meshes, contours, or deformable models. For example, the first coordinates may represent a first set of anatomical landmarks defined with respect to a first mesh, i.e., in a first coordinate system, the second coordinates may represent a second set of anatomical landmarks defined with respect to a second mesh, i.e., in a second coordinate system, and a reference deformable model may be provided for obtaining a transformation between the first coordinate system and the second coordinate system. Accordingly, the first mesh and the second mesh may be mutually aligned, anatomical landmarks may be transferred between both meshes, etc.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be subdivided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for determining a transformation between different coordinate systems associated with different medical data, comprising:
    a landmark input for obtaining first coordinates representing a first set of anatomical landmarks in a first coordinate system and second coordinates representing a second set of anatomical landmarks in a second coordinate system;
    a matching subsystem configured for:
        providing reference coordinates representing a third set of anatomical landmarks in a reference coordinate system, the third set of anatomical landmarks comprising the first set of anatomical landmarks and the second set of anatomical landmarks; and
        determining a transformation between the first coordinate system and the second coordinate system by:
            i) determining a first intermediate transformation between the first coordinate system and the reference coordinate system by matching the first set of anatomical landmarks to the third set of anatomical landmarks;
            ii) determining a second intermediate transformation between the second coordinate system and the reference coordinate system by matching the second set of anatomical landmarks to the third set of anatomical landmarks; and
            iii) combining the first intermediate transformation and the second intermediate transformation to obtain the transformation.

2. The system according to claim 1, wherein the third set of anatomical landmarks is defined with respect to a deformable model such that the reference coordinates representing the third set of anatomical landmarks is defined in a reference coordinate system associated with the deformable model, the deformable model being arranged for fitting an anatomical structure in a medical image.

3. The system according to claim 2, wherein the deformable model represents a mean shape of the anatomical structure across a plurality of patients, or a patient adapted model adapted for the anatomical structure of a patient.

4. The system according to claim 2, wherein the deformable model is represented by model data defining geometry of the anatomical structure in the medical image, and wherein the third set of anatomical landmarks is encoded in the model data.

5. The system according to claim 1, wherein each landmark of the first set of anatomical landmarks, the second set of anatomical landmarks and the third set of anatomical landmarks is constituted by a coordinate and an anatomical label, and wherein the matching subsystem is configured for matching sets of anatomical landmarks by matching anatomical labels of the sets of anatomical landmarks.

6. The system according to claim 5, wherein the matching subsystem is configured for differently weighting matching anatomical landmarks when obtaining the first intermediate transformation and/or the second intermediate transformation.

7. The system according to claim 1, wherein the first set of anatomical landmarks is defined with respect to a first medical image and the second set of anatomical landmarks is defined with respect to a second medical image.

8. The system according to claim 7, wherein the matching subsystem is configured for using the transformation to mutually align the first medical image and the second medical image.

9. The system according to claim 8, further comprising a display subsystem for simultaneously displaying the first medical image and the second medical image after said mutually aligning.

10. The system according to claim 1, wherein the matching subsystem is configured for using the transformation to complement the first set of anatomical landmarks with one or more anatomical landmarks of the second set of anatomical landmarks.

11. The system according to claim 1, wherein the first set of anatomical landmarks is defined with respect to a first mesh, the second set of anatomical landmarks is defined with respect to a second mesh, and wherein the matching subsystem is configured for using the transformation to mutually align the first mesh and the second mesh.

12. The system according to claim 1, wherein the first set of anatomical landmarks and the second set of anatomical landmarks are non-identical or disjunct sets.

13. Workstation or imaging apparatus comprising the system according to claim 1.

14. A method for determining a transformation between different coordinate systems associated with different medical data, comprising:
   obtaining first coordinates representing a first set of anatomical landmarks in a first coordinate system;
   obtaining second coordinates representing a second set of anatomical landmarks in a second coordinate system;
   providing reference coordinates representing a third set of anatomical landmarks in a reference coordinate system, the third set of anatomical landmarks comprising the first set of anatomical landmarks and the second set of anatomical landmarks; and
   determining a transformation between the first coordinate system and the second coordinate system by:
   i) determining a first intermediate transformation between the first coordinate system and the reference coordinate system by matching the first set of anatomical landmarks to the third set of anatomical landmarks;
   ii) determining a second intermediate transformation between the second coordinate system and the reference coordinate system by matching the second set of anatomical landmarks to the third set of anatomical landmarks; and
   iii) combining the first intermediate transformation and the second intermediate transformation to obtain the transformation.

15. A non-transitory computer-readable medium storing computer program product comprising instructions for causing a processor system to perform the method according to claim 14.

* * * * *